US007628884B2

(12) United States Patent
Berselli et al.

(10) Patent No.: US 7,628,884 B2
(45) Date of Patent: Dec. 8, 2009

(54) PROCESS FOR MANUFACTURING TILES CONTAINING DECORATIONS CONSTITUTED BY CRYSTALLISED ORGANIC AND INORGANIC ELEMENTS

(75) Inventors: Franco Berselli, Spezzano Di Fiorano (IT); Diego Mottalini, No. 31, Via Danubio, Spezzano Di Fiorano (Modena) (IT) I-41042

(73) Assignee: Diego Mottalini, Pavullo nel Frignano, Modena (IT)

( * ) Notice: Subject to any disclaimer, the term of this patent is extended or adjusted under 35 U.S.C. 154(b) by 633 days.

(21) Appl. No.: 11/201,337

(22) Filed: Aug. 11, 2005

(65) Prior Publication Data

US 2005/0263942 A1 Dec. 1, 2005

Related U.S. Application Data

(62) Division of application No. 10/250,313, filed on Jun. 30, 2003, now abandoned.

(51) Int. Cl.

*B29C 65/00* (2006.01)
*B29C 39/00* (2006.01)
*B32B 37/00* (2006.01)

(52) U.S. Cl. .................... 156/293; 156/303.1; 264/239; 264/241; 264/245; 264/250; 264/259

(58) Field of Classification Search ................. 156/293, 156/303.1; 264/239, 241, 245, 250, 259
See application file for complete search history.

(56) References Cited

U.S. PATENT DOCUMENTS

| | | | | | |
|---|---|---|---|---|---|
| 3,344,011 | A | | 9/1967 | Goozner | |
| 3,487,496 | A | * | 1/1970 | Warbington et al. | 16/414 |
| 4,036,929 | A | | 7/1977 | Gould | |
| 4,263,734 | A | | 4/1981 | Bradshaw | |
| 5,015,516 | A | | 5/1991 | Lussi et al. | |

FOREIGN PATENT DOCUMENTS

| | | | |
|---|---|---|---|
| CH | 608 432 | | 1/1979 |
| EP | 0 154 222 | | 9/1985 |
| FR | 2 285 976 | | 4/1976 |
| FR | 2 311 644 | | 12/1976 |
| FR | 2 519 679 | | 7/1983 |
| GB | 2220445 | * | 1/1990 |
| JP | 63022965 | * | 1/1988 |

* cited by examiner

*Primary Examiner*—Justin Fischer

(57) ABSTRACT

The process comprises insertion of an element in tiles by cementing, the element being obtained by sinking organic or inorganic objects into a transparent matrix made using polyester trivalent, acrylic, or epoxy resin, and a subsequent hermetic crystallization of the organic or inorganic element in the transparent matrix. The system for fixing the element in the tile can be done using a paper lattice and glass fibre with silicone glue or hot-gluing done on the back of the tile, or by simple cementing between the lateral surface the transparent element and the lateral surface of the recess made in the tile. The fixture can comprise a further stage of decorative and fixture-coating on the visible side of the tile. The invention can be applied on colored two-faces tiles so that the insert, thanks to the fact that it is transparent, can be visible on both sides.

2 Claims, 1 Drawing Sheet

PROCESS FOR MANUFACTURING TILES CONTAINING DECORATIONS CONSTITUTED BY CRYSTALLISED ORGANIC AND INORGANIC ELEMENTS

CROSS REFERENCE TO RELATED APPLICATIONS

This application is a division of application Ser. No. 10/250,313, filed on Jun. 30, 2003, now abandoned, the entire contents of which are hereby incorporated by reference.

TECHNICAL FIELD

The invention relates to the field of processes for decorating tiles and includes decorations on wood bases.

BACKGROUND ART

In the field of ceramic manufacturing, specifically tiles, apart from various products in which the decoration is made by applying paint in designs on a single tile (on one or both faces of the tiles), there also exist products where the tile itself is made as a composition (a sort of marquetry) of parts of different types, generally small parts brought in from other tiles or variously-coloured faced stones, cemented together along their longer edges or onto a support.

These process can be relatively complex.

The present invention proposes to make possible an insertion of a decoration of any shape or size and, in particular a decoration constituted by organic or inorganic elements (including flower, vegetation, shells and others) which are sunk and crystallized hermetically within special polyester resins, trivalent, acrylic or epoxy, all having the characteristic of being transparent, set internally of pre-cut tiles of any shape, thickness and size, made of cottoforte or vitrified stoneware or wood.

DISCLOSURE OF INVENTION

Figure 1:
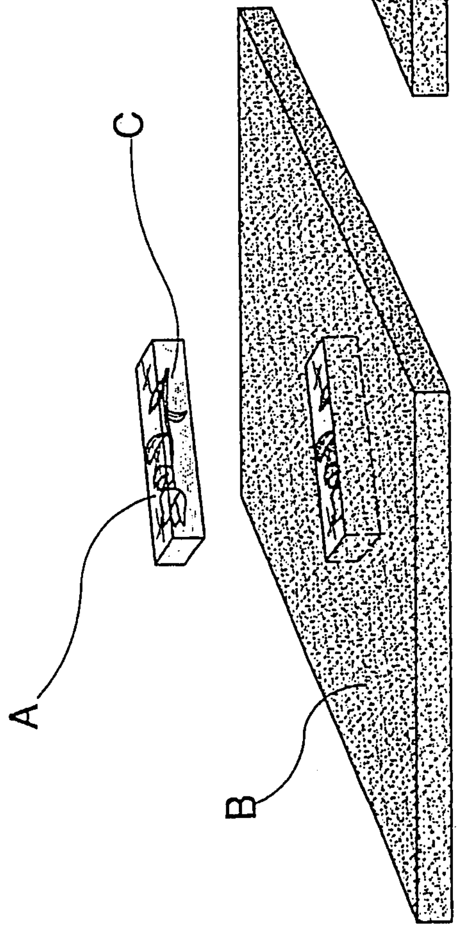
FIGS. 1 and 2 depict decorative tiles made using the method of the claimed invention.
Figure 2:
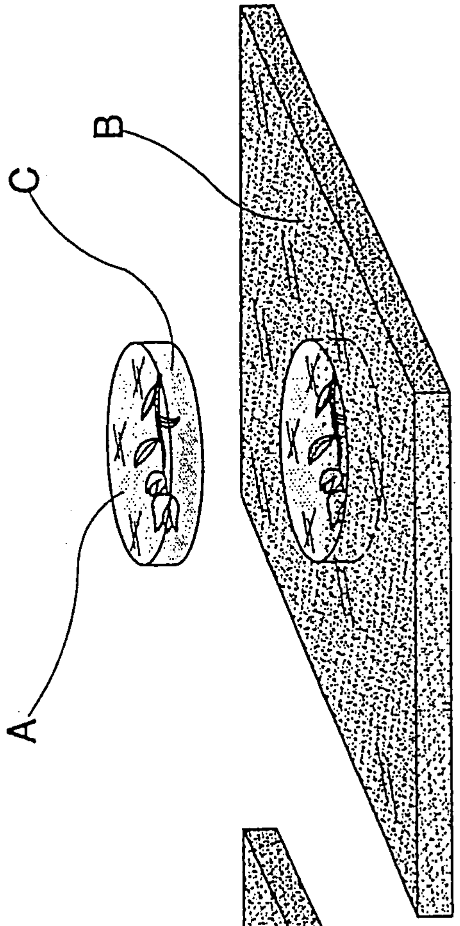

The characteristics of the invention will better appear from the description of a preferred embodiment thereof herein illustrated in the form of a non-limiting embodiment in FIGS. 1 and 2 of the drawings, which show the application in a schematic perspective view.

In the figures of the drawings, A denotes a crystallised transparent element containing, as a perfectly-visible decorative part, natural organic or inorganic elements (such as flowers, vegetation, shells and so on) which are sunk and hermetically crystallised in special polyester resin, trivalent, acrylic or epoxy, all of which have the characteristic of being transparent.

B denotes a ceramic material or wood, in the illustrated example a tile, of any shape, thickness and dimensions, made of any material, for example cottoforte or vitrified stoneware or wood, in which a recess has been made, or a seating predisposed to receive an element A.

C denotes the lateral surface of element A which can be used for possible fixing between element A and material B.

The system for fixing element A to material B, i.e. the tile, can be of various kinds. For example, it can be done using a paper lattice and glass fibre with silicone glue or hot-gluing done on the back of the tile, or by simple cementing between lateral surface-C of element A and the lateral surface of the recess made in the tile, as can be seen from FIGS. 1 and 2.

In the accompanying figures the ceramic-material or wood in a tile-shape indicated by B can be either single-face or double-face. It can exhibit only one face or side as the side "in-view", i.e. visible to the observer, or it can exhibit both faces or sides predisposed to be in view-for example, for use in a wall.

The fixture between element A and material B can comprise a further stage of decorative and fixture-coating on the visible side of the tile or on both sides thereof, if both sides are intended to be visible.

The invention can be applied on coloured two-faced tiles so that the insert, thanks to the fact that it is transparent, can be visible on both sides.

In the case of single-facing application in a traditional tile, the invention can be coloured on one side using any type of glaze, with the aim of achieving a colour match (or scheme) with the surface of the support tile.

The invention achieves the aim of opening a new field of industrial application of special interest, both technological and artistic, taking into account the particular beauty of the compositions which can be obtained through the use of natural elements of any kind, both organic and inorganic, in a transparent matrix which enables the elements to be seen.

Element A can have a decorative function, as a single piece to be used as an insert, fillet or edge, and can either partially or totally substitute floors and coverings.

The invention claimed is:

1. A process for manufacturing tiles, comprising providing a tile having a recess therein, sinking objects into a transparent matrix, hardening the transparent matrix, and then cementing the transparent matrix into said recess, wherein said recess is a through hole and said transparent matrix is visible from opposite sides of said tile.

2. A process for manufacturing a tile, comprising:

(i) providing a body having visible objects in a transparent matrix, and (ii) inserting said body into a through hole provided in a tile, the tile being readable on both of its sides.

* * * * *